(12) United States Patent
Sato et al.

(10) Patent No.: US 9,093,904 B2
(45) Date of Patent: Jul. 28, 2015

(54) RESONANT SWITCHING POWER SUPPLY DEVICE

(75) Inventors: Tadahiko Sato, Matsumoto (JP);
Hidetomo Ohashi, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 155 days.

(21) Appl. No.: 13/980,039

(22) PCT Filed: Aug. 24, 2011

(86) PCT No.: PCT/JP2011/069007
§ 371 (c)(1),
(2), (4) Date: Jul. 16, 2013

(87) PCT Pub. No.: WO2012/105077
PCT Pub. Date: Aug. 9, 2012

(65) Prior Publication Data
US 2013/0308347 A1 Nov. 21, 2013

(30) Foreign Application Priority Data

Feb. 1, 2011 (JP) .................................. 2011-019952

(51) Int. Cl.
| H02M 1/32 | (2007.01) |
| H02M 3/337 | (2006.01) |
| H02M 3/335 | (2006.01) |
| H02M 1/00 | (2007.01) |

(52) U.S. Cl.
CPC ............... *H02M 1/32* (2013.01); *H02M 3/337* (2013.01); *H02M 3/33507* (2013.01); *H02M 2001/0058* (2013.01); *Y02B 70/1433* (2013.01); *Y02B 70/1491* (2013.01)

(58) Field of Classification Search
USPC ............... 363/20–28; 323/235, 247, 319, 328
See application file for complete search history.

(56) References Cited

U.S. PATENT DOCUMENTS

| 6,473,316 B2* | 10/2002 | Fujiyama et al. ............... 363/17 |
| 6,504,732 B2* | 1/2003 | Abe ................................. 363/17 |
| 8,581,510 B2* | 11/2013 | Nakada et al. ................ 315/291 |
| 2007/0114952 A1* | 5/2007 | Yang ............................. 315/307 |
| 2007/0274105 A1 | 11/2007 | Osaka |

FOREIGN PATENT DOCUMENTS

| JP | H09-308243 | 11/1997 |
| JP | H10-225122 | 8/1998 |
| JP | H11-332232 | 11/1999 |
| JP | 2005-198456 A | 7/2005 |
| JP | 2005-198457 A | 7/2005 |
| JP | 2005-318719 A | 11/2005 |
| JP | 2007-195287 A | 8/2007 |

* cited by examiner

*Primary Examiner* — Jessica Han
(74) *Attorney, Agent, or Firm* — Rabin & Berdo, P.C.

(57) ABSTRACT

A winding voltage arising in a first winding on the primary side of a transformer is detected in a winding voltage detector unit formed of a second winding, and current flowing through a resonant circuit is detected in a resonant current detector unit formed of an auxiliary capacitor and a resistor. The timing at which the polarity of the detected winding voltage is inverted is detected in a control and drive unit, and the time at which the polarity of the resonant current, whose phase is delayed with respect to that of the winding voltage, will be inverted is determined in advance. In the event that there is a switch in an on-state when the timing immediately before the inversion of the polarity of the resonant current is detected from the output of the resonant current detector unit, the control and drive unit forcibly turns off the switch.

11 Claims, 11 Drawing Sheets

RESONANT SWITCHING POWER SUPPLY DEVICE

TECHNICAL FIELD

The present invention relates to a current resonant DC-DC converter type resonant switching power supply device that includes a series resonant circuit having a resonant inductor and resonant capacitor.

BACKGROUND ART

Owing to characteristics such as small size, lightness, and low price, switching power supply devices are used as power supplies in a large number of electronic instruments. Among these, resonant switching power supply devices are widely used as power supplies for liquid crystal display devices, flat panel displays (flat screen televisions) such as plasma display panels, and personal computers, as the resonant switching power supply devices can realize low noise and high conversion efficiency.

Figure 8:
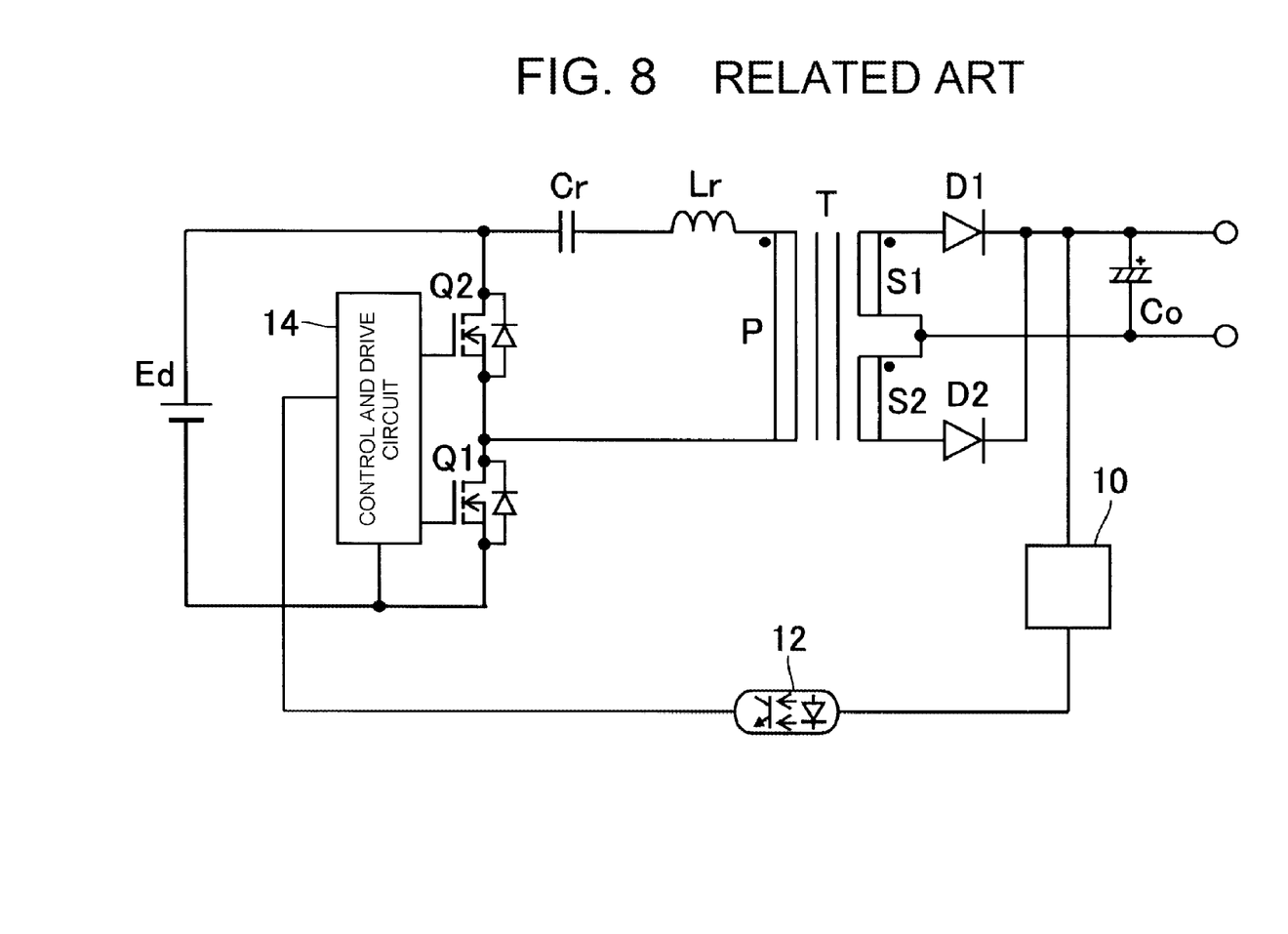
FIG. 8 is a circuit diagram of a general resonant switching power supply device.
Figure 9:
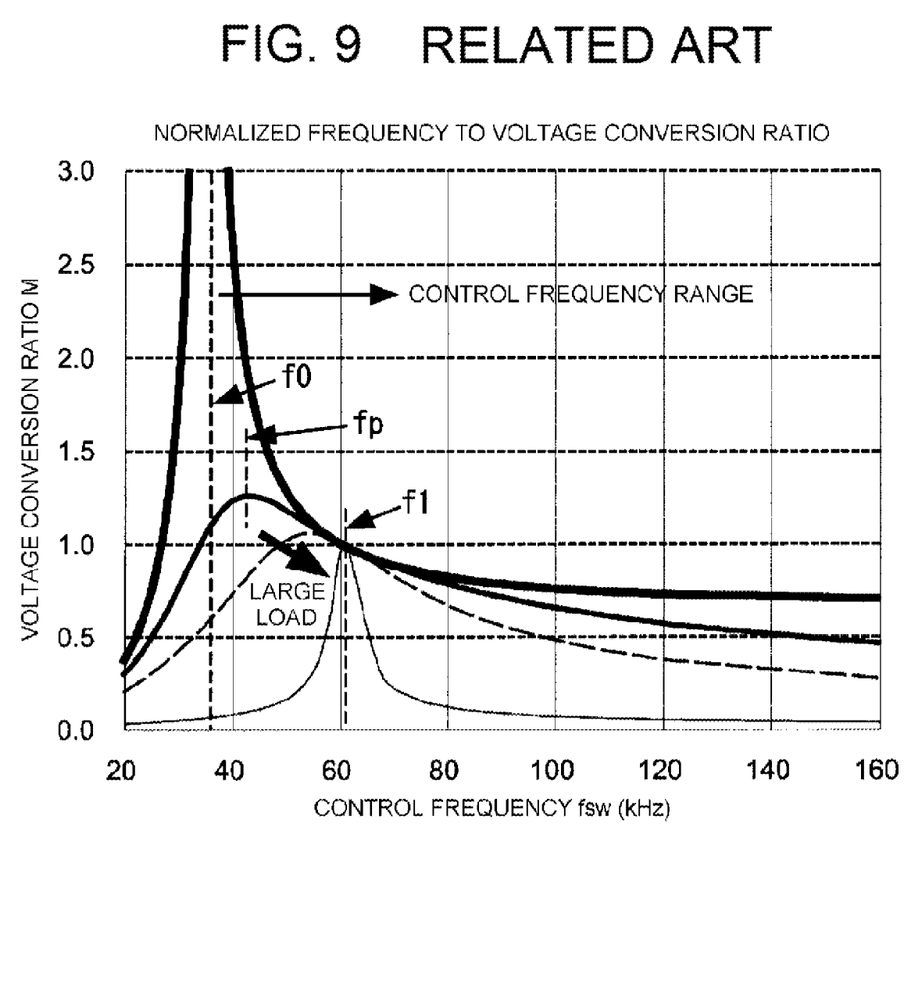
FIG. 9 is a diagram showing the input voltage conversion ratio of voltage generated in a transformer winding in response to a change in control frequency.
Figure 10A:
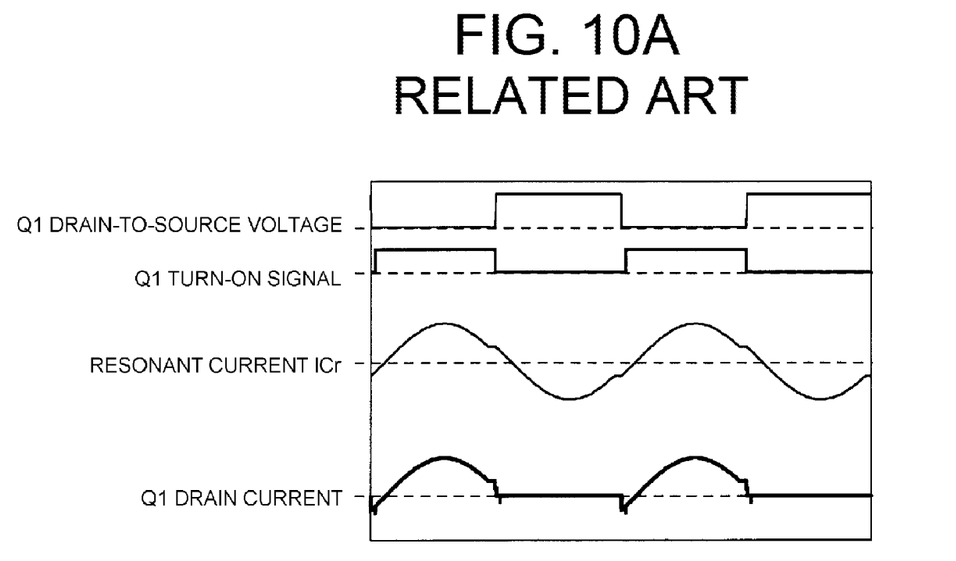
Figure 10B:
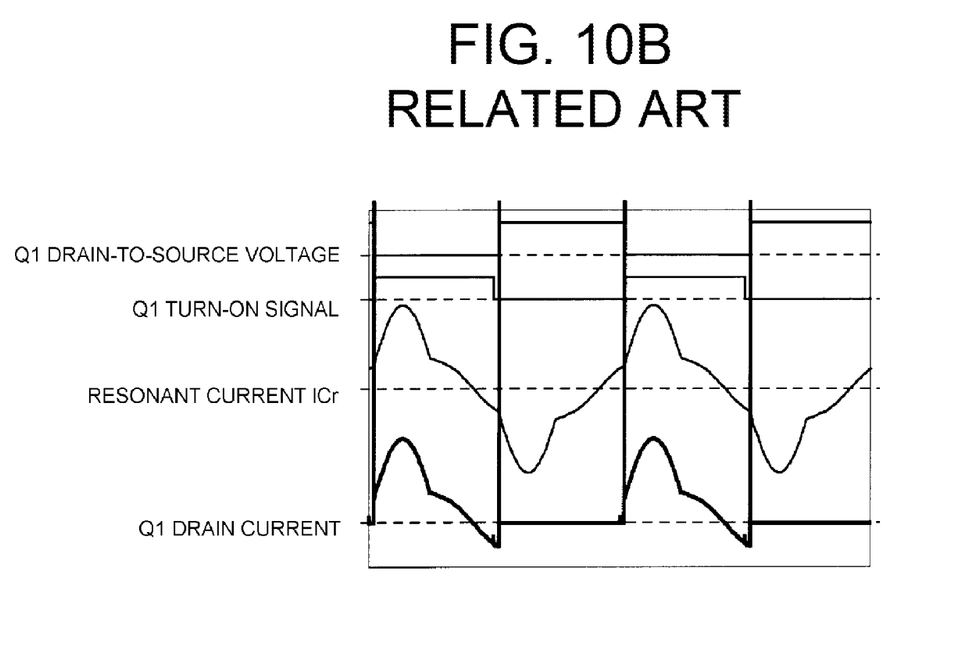
FIG. 10B shows an operation when the condition is such that the resonance deviates.

FIG. 8 is a circuit diagram of a general resonant switching power supply device, FIG. 9 is a diagram showing the input voltage conversion ratio of voltage generated in a transformer winding in response to a change in control frequency, and FIGS. 10A and 10B are diagrams showing changes in resonant current when controlling, wherein FIG. 10A shows an operation in a correct control condition, while FIG. 10B shows an operation when the condition is such that the resonance deviates. In FIGS. 10A and 10B, the broken lines show the zero level of each signal.

A general resonant switching power supply device includes as a main circuit two switches Q1 and Q2 connected in series to either end of a direct current power supply Ed. A series circuit of a resonant capacitor Cr, a resonant inductor Lr, and a winding P on the primary side of a transformer T is connected to both ends of the high side switch Q2. Although not shown, the winding P is formed of a leakage inductor of the transformer T and an exciting inductor. The leakage inductor may be used as the resonant inductor Lr, without providing a dedicated inductor separate from the transformer T. A rectifying and smoothing circuit having diodes D1 and D2 and a smoothing capacitor Co is connected to windings S1 and S2 on the secondary side of the transformer T. An output voltage monitor circuit 10, which detects output voltage, is connected to an output of the rectifying and smoothing circuit, and the output voltage monitor circuit 10 is connected to a control and drive circuit 14 via a photocoupler 12.

The control and drive circuit 14 controls the two switches Q1 and Q2 to be turned on and off alternately, controlling the on-state time of the two switches Q1 and Q2, or the frequency, so that the output voltage detected by the output voltage monitor circuit 10 is constant, thereby stabilizing the output voltage.

As can be seen from FIG. 9, which shows a voltage conversion ratio M of voltage generated in the winding of the transformer T in response to a change in a control frequency fsw that controls the switches Q1 and Q2 to be turned on and off, the voltage conversion ratio M depends on the control frequency fsw, because of which the resonant switching power supply device controls the voltage conversion ratio M by changing the control frequency fsw. That is, the resonant switching power supply device controls energy transmitted to the secondary side of the transformer T by changing the control frequency fsw. In the drawing, f0 is a first resonant frequency, which is the resonant frequency of the series resonant circuit of the resonant inductor (or transformer primary side leakage inductor), exciting inductor, and resonant capacitor Cr, and f1 is the resonant frequency of a series resonant circuit formed of the resonant inductor Lr (or transformer primary side leakage inductor), a synthetic inductor formed by the secondary side (load side) leakage inductor and transformer exciting inductor connected in parallel, and the resonant capacitor Cr. Frequency control is generally carried out in a frequency range higher than the first resonant frequency f0. That is, the control frequency fsw is raised when there is a light load, while the control frequency fsw is lowered when there is a heavy load, thereby controlling the energy transmitted to the secondary side. In a control region wherein the voltage conversion ratio M decreases in response to a rise in the frequency, the phase of the current flowing through the winding P on the primary side of the transformer T (that is, the resonant current) is delayed with respect to the voltage in the winding P.

In the heretofore described example of the resonant switching power supply device, a minimum operation frequency is set so that the inclination of a change in the voltage conversion ratio M in response to a change in the control frequency fsw is not reversed. However, a control frequency fp at which the voltage conversion ratio M reaches a peak comes nearer to the resonant frequency f1 as the load becomes heavier (the peak at the frequency f0, shown by the heavy lines in FIG. 9, corresponds to a case in which the load is zero). In the event that the minimum frequency setting is set in the vicinity of the first resonant frequency f0, the phase of the current advances with respect to the voltage of the winding P on the primary side of the transformer T when the control frequency fsw falls below the control frequency fp due to an abrupt change in the load or input voltage, or the like.

At this time, as shown in FIGS. 10A and 10B, it may happen that the resonant current is inverted during the on-state period of each of the switches Q1 and Q2. That is, in a correct control condition, the switch Q1 is turned off before the resonant current (Cr current) is inverted, as shown in FIG. 10A. However, it may happen that the resonant current is inverted before the switch Q1 is turned off, as shown in FIG. 10B. When the switch Q1 is turned off in this condition, the current that has been flowing through the switch Q1 flows into the diode connected in parallel to the switch Q1. When the switch Q2 is turned on in this condition, a reverse voltage is applied to the diode connected in parallel to the switch Q1, and a recovery current flows into that diode. As the recovery current has an extremely high temporal change rate, that is, di/dt, excessive stress is placed on the switches Q1 and Q2, leading in the worst case to element destruction. This phenomenon is called resonant deviation, and it is important to prevent this phenomenon in order to realize high power supply reliability.

When adopting a minimum frequency setting in the vicinity of f1 in an attempt to avoid an inversion of the resonant current, it is no longer possible to obtain a voltage conversion ratio M of one or more. That is, it is not possible to secure the necessary output voltage when the input voltage is low, and as the possible control range is reduced because of this, it is not desirable to adopt a minimum frequency setting in the vicinity of f1.

Technology whereby the resonant current (or switching current) is detected, and it is detected whether or not the control frequency for turning the switches on and off is beyond the lower limit of the control range from whether or not the fall (trailing edge) of a switch gate drive signal is in the vicinity of zero resonant current, is known as technology that prevents an inversion of resonant current (refer to PTL 1). When the control frequency is outside the control range, the control frequency is returned to the normal control range by changing the timing of a change or oscillation of the control frequency.

Also, a method whereby, in order to avoid an inversion of the resonant current, the detected value of the resonant current is simply compared with a threshold value voltage, and the switch is forcibly turned off when the absolute value of the resonant current becomes lower than the absolute value of the threshold value voltage, is also conceivable.

Also, there is known technology whereby the resonant current is detected, and a switch is turned off when the absolute value of the resonant current, after becoming higher than the absolute value of a first threshold value, becomes lower than the absolute value of a second threshold value whose absolute value is lower than that of the first threshold value (refer to PTL 2).

CITATION LIST

Patent Literatures

PTL 1: JP-A-9-308243
PTL 2: JP-A-2005-198456

SUMMARY OF INVENTION

Technical Problem

However, the heretofore-known technology described in PTL 1 is such that there is a sequence wherein, after it is detected that the fall (trailing edge) of a switch gate drive signal is in the vicinity of zero resonant current, an oscillator circuit that determines the turning on and off of the switch is reset, and the switch is turned off when the resetting of the oscillator circuit is completed. When adding the time delay needed for the detection of the phenomenon, the resetting of the oscillator circuit, and the driving of the switch, a delay of several hundred nanoseconds or more occurs, because of which a problem occurs in that it is difficult to obtain complete protection whereby the switch is turned off before the resonant current is inverted.

Also, the method whereby the resonant current and threshold value voltage are simply compared is such that, taking into consideration the matter that the time from the resonant current reaching the threshold value until actually becoming zero varies depending on the actual current configuration, input voltage, and the like, and that there is the heretofore described kind of delay time in the circuit operation, and the like, a rather high threshold value voltage is necessary. Because of this, in a condition wherein, because of a light load, the resonant current is small and does not exceed the threshold value voltage, or only exceeds the threshold value voltage for a short time, the switch is not turned on at all, or is barely turned on, and a problem occurs in that it is no longer possible to fulfill the original function of the power supply device.

Also, the heretofore-known technology described in PTL 2 is such that there is a problem of delay and noise in a feedback system that feeds the output voltage back to the control system. That is, as a delay factor is included in the feedback system in order to maintain the stability of the whole system when the load is suddenly changed from a heavy load to a light load, the control system cannot recognize for a while that the load has become lighter, and maintains a long switching cycle. Meanwhile, as a resonant operation of the resonant circuit is adjusted to the sudden change in load, the resonant current is inverted during the long switching cycle (the on-state period of the switch is also lengthened accordingly). In this case, as the resonant operation is in accordance with a light load, it is not possible for the absolute value of the resonant current to rise higher than the absolute value of the first threshold value, and the second threshold value is not validated, because of which it is not possible to prevent inversion of the resonant current.

Furthermore, it may happen when operating with a light load that noise is superimposed in the feedback system, and the switching cycle is unintentionally lengthened, but in this case too, it is not possible for the absolute value of the resonant current to rise higher than the absolute value of the first threshold value, and the second threshold value is not validated, because of which it is not possible to prevent inversion of the resonant current.

The invention, having been contrived bearing in mind these kinds of points, has an object of providing a highly reliable resonant switching power supply device such that inversion of resonant current in a period in which a switch is in an on-state is prevented, the on-state of a switch is guaranteed even when there is a light load, and there is no effect from delay or noise in a feedback system.

SUMMARY

In order to solve the heretofore described problems, the invention provides a resonant switching power supply device characterized by including a protection function whereby a switch is reliably turned off before the resonant current is inverted. That is, the resonant switching power supply device is such that a first switch and second switch are connected in series to either end of a terminal into which a direct current voltage is input. A series circuit of a resonant capacitor, one or both of a resonant inductor and transformer leakage inductor, and a first winding on the primary side of the transformer, is connected to both ends of the first switch or second switch. The resonant switching power supply device further includes a resonant current detector unit that detects a resonant current flowing through the series circuit, a winding voltage detector unit that detects a winding voltage, which is the voltage across the first winding of the transformer, and a control and drive unit that drives the first switch and second switch to be turned on and off alternately. The control and drive unit has a protection function whereby, in the event that, after it is detected that the polarity of the detected winding voltage has been inverted, either the first switch or second switch is not in an off-state when it is detected that the detected resonant current has exceeded a threshold value with respect to the resonant current immediately before the inversion of the polarity of the winding voltage (the absolute value of the detected resonant current has become lower than the absolute value of the threshold value immediately before the inversion of the polarity), the switch is turned off.

According to the resonant switching power supply device, before the current flowing through the first or second switch in a period in which the first or second switch is in an on-state is inverted, an inversion of the polarity of the winding voltage, whose phase is further advanced than that of the resonant current, is detected, and it is thus detected in advance that the resonant current will be inverted. Subsequently, in the event that the first or second switch is in an on-state at a timing immediately before the polarity of the resonant current is inverted, the first or second switch is forcibly turned off, thus preventing an inversion of the resonant current polarity.

Advantageous Effects Of Invention

The resonant switching power supply device with the heretofore described configuration is such that it is possible to detect in advance that the polarity of the resonant current will be inverted by detecting the timing of an inversion of the polarity of the winding voltage, whose phase is further advanced than that of the resonant current, and it is thus possible, in the event that the first or second switch is in an on-state, to turn the switch off before the polarity of the resonant current is inverted. Because of this, it no longer happens that a recovery current flows through the diode connected in parallel to the switch, generating a large di/dt, and it is thus possible to provide a more highly reliable power supply device.

Also, as the switch is not turned off until it is detected in advance that the resonant current will be inverted by detecting an inversion of the polarity of the winding voltage, whose phase is further advanced than that of the resonant current, the on-state of the switch is guaranteed even when there is a light load.

Also, as the decision as to whether to activate a forcible turning off of the first or second switch at a timing immediately before the inversion of the polarity of the resonant current depends on the output of the winding voltage, it does not happen that there is a failure to prevent the inversion of the resonant current due to delay or noise.

The heretofore described and other objects, characteristics, and advantages of the invention will be made clear by the attached drawings representing embodiments preferred as examples of the invention, and by the following related description.

BRIEF DESCRIPTION OF THE DRAWINGS

FIGS. 10A and 10B are diagrams showing changes in resonant current when controlling, wherein FIG. 10A shows an operation in a correct control condition, while

DETAILED DESCRIPTION

Hereafter, a detailed description will be given, referring to the drawings, of embodiments of the invention.

Figure 1:
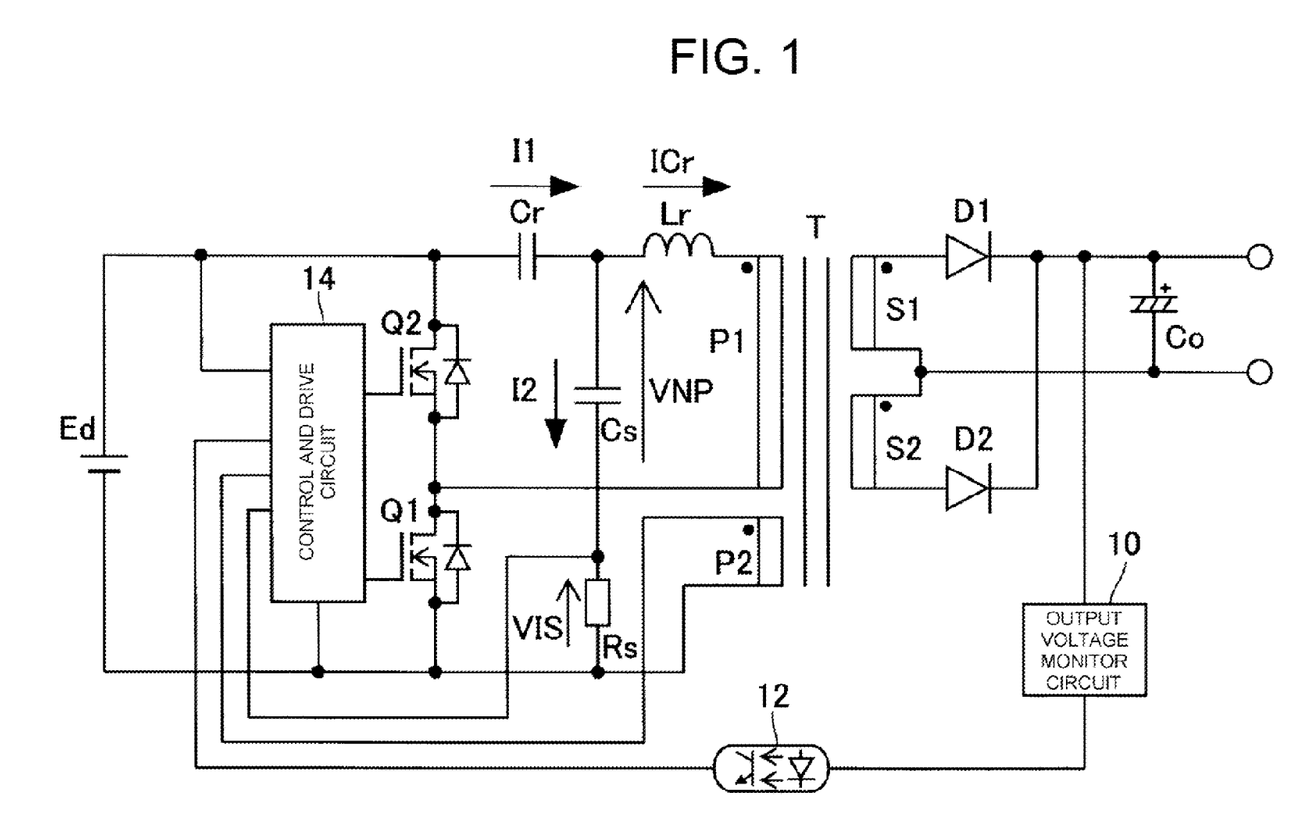
FIG. 1 is a circuit diagram showing an example of a configuration of a resonant switching power supply device according to a first embodiment.
Figure 2:
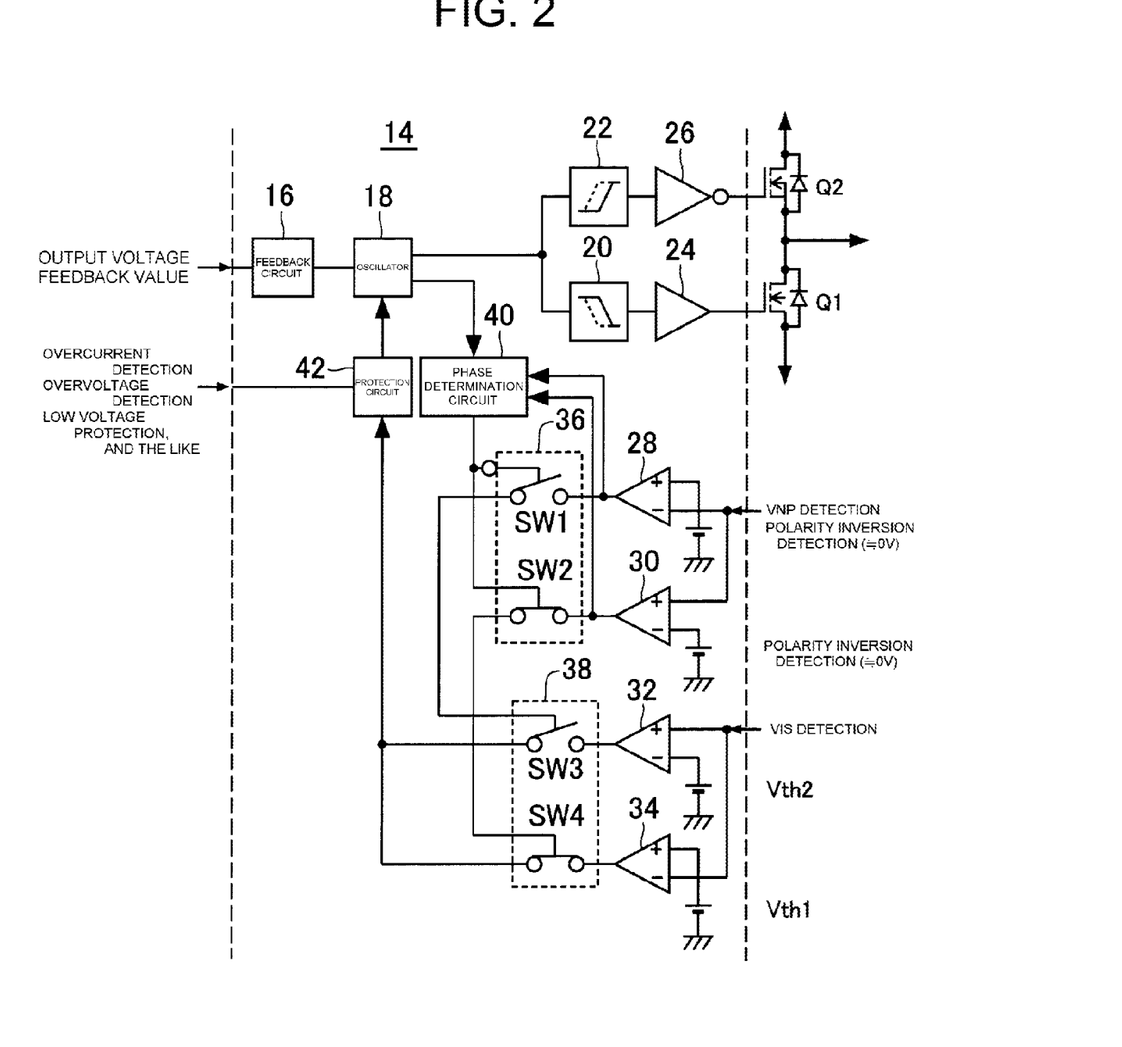
FIG. 2 is a circuit diagram showing an example of a configuration of a control and drive circuit.
Figure 3:
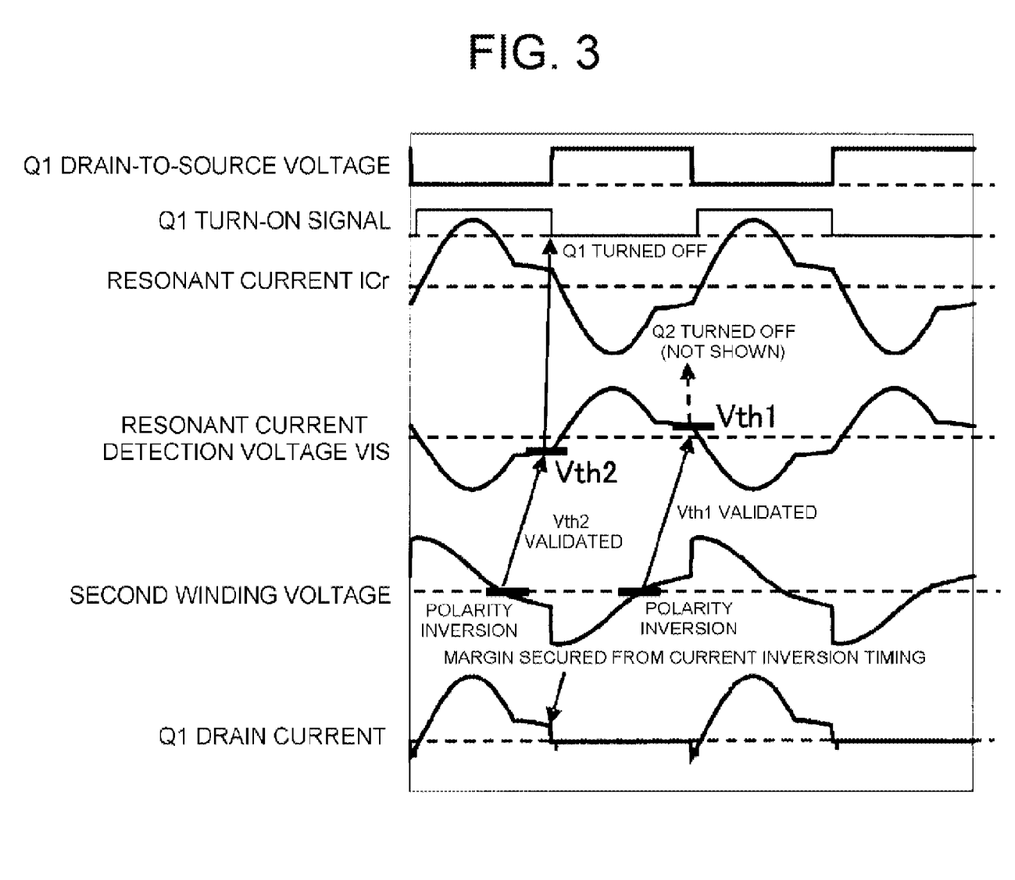
FIG. 3 is an illustration showing an operating condition of the resonant switching power supply device according to the first embodiment.

FIG. 1 is a circuit diagram showing an example of a configuration of a resonant switching power supply device according to a first embodiment, FIG. 2 is a circuit diagram showing an example of a configuration of a control and drive circuit, and FIG. 3 is an illustration showing an operating condition of the resonant switching power supply device according to the first embodiment.

The resonant switching power supply device according to the first embodiment includes as a main circuit two switches Q1 and Q2 of a half-bridge configuration connected in series to either end of a direct current output direct current power supply Ed. A built-in parasite diode or external freewheeling diode is connected in anti-parallel to each of the switches Q1 and Q2. In the example shown in the drawing, the switches Q1 and Q2 are represented as MOSFETs (Metal-Oxide Semiconductor Field-Effect Transistors).

A series circuit of a resonant capacitor Cr, a resonant inductor Lr, and a first winding P1 on the primary side of a transformer T configures a resonant circuit, and is connected to both ends of the high side switch Q2. The first winding P1 has an exciting inductor and leakage inductor of the transformer T as an equivalent circuit. The resonant inductor Lr may be configured of the leakage inductor.

The transformer T also includes on the primary side thereof a second winding P2. The second winding P2 is formed in close proximity to the first winding P1 so that the coupling coefficient with the first winding P1 is high. By the coupling coefficient being high, it is possible to virtually eliminate a difference in phase between a voltage VNP (shown in the drawing as a voltage caused by the resonant inductor Lr and leakage inductance of the first winding P1) arising in the first winding P1 and the voltage of the second winding P2. Because of this, the second winding P2 can accurately detect a voltage proportional to, and having no phase difference with, the voltage VNP of the first winding P1. Because of this, the second winding P2 configures a winding voltage detector unit that detects the voltage VNP of the first winding P1. The second winding P2 is connected to a control and drive circuit 14, and a detected voltage is supplied to the control and drive circuit 14.

As the timing of a polarity inversion at which the voltage detected by the second winding P2 becomes zero is detected in the control and drive circuit 14, a description will be given of the timing at which the voltage VNP becomes zero.

When taking the voltage across the resonant capacitor Cr to be VCr and the voltage of the input terminal direct current power supply Ed to be E, and considering in terms of the series circuit of the resonant capacitor Cr and first winding P1, the relationship between VCr, VNP, and E when the switch Q1 is in an on-state and the switch Q2 in an off-state is expressed by $$VCr+VNP=E \ldots \quad (1),$$

meaning that the voltage VNP of the first winding P1 is $$VNP=E-VCr \ldots \quad (2).$$

According to relational expression (2), the timing at which the voltage VNP becomes zero is when the voltage VCr of the resonant capacitor Cr becomes equal to the voltage E of the input terminal. As the voltage VCr of the resonant capacitor Cr and a resonant current ICr have a phase difference of 90 degrees, it can also be said that the timing at which the voltage VNP becomes zero is when the resonant current ICr flowing through the resonant capacitor Cr reaches a peak.

Meanwhile, the relationship between VCr and VNP when the switch Q1 is in an off-state and the switch Q2 in an on-state is expressed by $$VCr+VNP=0 \ldots \quad (3),$$

meaning that the voltage VNP of the first winding P1 is $$VNP = -VCr \ldots \quad (4).$$

According to relational expression (4), the timing at which the voltage VNP becomes zero is when the voltage VCr of the resonant capacitor Cr becomes zero. As the voltage VCr of the resonant capacitor Cr and the resonant current ICr have a phase difference of 90 degrees, it can also be said that the timing at which the voltage VNP becomes zero is when the resonant current ICr flowing through the resonant capacitor Cr reaches a bottom (a negative side peak).

Herein, the voltage VNP represents the state of the resonant circuit resonant operation and, as the invention uses the voltage VNP, the feedback system delay or noise problem of PTL 2 does not occur.

The secondary side of the transformer T has two windings S1 and S2, and a rectifying and smoothing circuit having a full wave rectifier circuit formed of diodes D1 and D2 and a smoothing circuit formed of a smoothing capacitor Co is connected to the windings S1 and S2. The output terminals of the rectifying and smoothing circuit configure direct current output terminals of the resonant switching power supply device, and an unshown load is connected thereto. An output voltage monitor circuit 10, which detects output voltage, is connected to the positive output terminal of the rectifying and smoothing circuit, the output of the output voltage monitor circuit 10 is connected to the control and drive circuit 14 via an insulation circuit formed of a photocoupler 12, and the output voltage detected by the output voltage monitor circuit 10 is fed back to the control and drive circuit 14.

A series circuit of an auxiliary capacitor Cs and a resistor Rs is connected between a connection point of the resonant capacitor Cr and resonant inductor Lr and the negative terminal of the direct current power supply Ed. Herein, the auxiliary capacitor Cs configures a resonant current detector unit together with the resistor Rs. The current detection principle of the circuit will be described hereafter. Taking currents flowing through the resonant capacitor Cr and auxiliary capacitor Cs to be I1 and I2 respectively, the voltage across the auxiliary capacitor Cs to be VCs, and the resistance value of the resistor Rs to be small enough that the effect thereof can be ignored, the following equations are established.

$$VCr + VCs = E \ldots \quad (5)$$

$$I1 - I2 = ICr \ldots \quad (6)$$

$$Cr \cdot VCr = \int I1 \cdot dt \ldots \quad (7)$$

$$Cs \cdot VCs = \int I2 \cdot dt \ldots \quad (8)$$

When differentiating relational expression (5) by time, then arranging by substituting with the result of differentiating relational expressions (7) and (8), the following equation is obtained.

$$I1/Cr = -I2/Cs \ldots \quad (9)$$

When substituting relational expression (9) with relational expression (6), the following equation is obtained.

$$I2 = -Cs \cdot ICr \cdot (Cr + Cs) \ldots \quad (10)$$

That is, as the current flowing through the auxiliary capacitor Cs is proportional to the resonant current ICr, the current is converted into a detection voltage VIS and detected by the resistor Rs, and supplied to the control and drive circuit 14 as a voltage proportional to the resonant current ICr. As the capacitance of the auxiliary capacitor Cs is far smaller than the capacitance of the resonant capacitor Cr, the absolute value of I2 is far smaller than the absolute value of I1 or the resonant current ICr according to relational expressions (9) and (10), and it is possible to ignore the effect on the resonant circuit of I2 diverging from I1. Also, as can be seen from relational expression (10), the reference signs of the current I1 and voltage VIS and the reference sign of the resonant current ICr are reversed, so when one is positive the other is negative. As this reversal of reference signs is an aspect of the configuration of this embodiment, another resonant current detector unit, wherein the reference signs are not reversed, may be adopted.

The control and drive circuit 14, based on the output voltage fed back from the output voltage monitor circuit 10, controls a control frequency that turns the two switches Q1 and Q2 on and off alternately so that the output voltage is constant. Also, the control and drive circuit 14 corrects the control frequency based on the detected winding voltage and resonant current. A detailed example of a configuration of the control and drive circuit 14 will be described using FIG. 2.

The control and drive circuit 14 includes a feedback circuit 16, an oscillator 18 into which is input the output of the feedback circuit 16, dead time generator circuits 20 and 22 into which is input the output of the oscillator 18, a low side driver 24, and a high side driver 26. The low side driver 24 is connected so as to drive the switch Q1, while the high side driver 26 is connected so as to drive the switch Q2.

The control and drive circuit 14 also includes comparators 28, 30, 32, and 34, a first selector 36 having two switches SW1 and SW2, a second selector 38 having two switches SW3 and SW4, a phase determination circuit 40, and a protection circuit 42.

The output of the second winding P2 on the primary side of the transformer T is connected to the inversion input of the comparator 28, while a reference voltage corresponding to a polarity inversion detection threshold value is connected to the non-inversion input. The reference voltage corresponding to the polarity inversion detection threshold value is connected to the inversion input of the comparator 30, while the output of the second winding P2 on the primary side of the transformer T is connected to the non-inversion input. The comparators 28 and 30, the reference voltage thereof having a value in the vicinity of zero volts, including zero volts, configure a polarity detector circuit. The output of the comparator 28 is connected to one terminal of the switch SW1 of the first selector 36 and to the phase determination circuit 40, while the output of the comparator 30 is connected to one terminal of the switch SW2 of the first selector 36 and to the phase determination circuit 40. The phase determination circuit 40 is connected so as to receive the output of the oscillator 18, and the output of the phase determination circuit 40 is connected to the inversion control input of the switch SW1 of the first selector 36 and to the control input of the switch SW2.

The detection voltage VIS detected in the resonant current detector unit is input into the non-inversion input of the comparator 32, while a reference voltage corresponding to a negative second threshold value Vth2 (as the polarity of the detection voltage VIS is the reverse of the polarity of the resonant current ICr, the second threshold value Vth2 is a threshold value with respect to a positive resonant current ICr) is connected to the inversion input. A reference voltage corresponding to a positive first threshold value Vth1 (as the polarity of the detection voltage VIS is the reverse of the polarity of the resonant current ICr, the first threshold value Vth1 is a threshold value with respect to a negative resonant current ICr) is connected to the non-inversion input of the comparator 34, while the detection voltage VIS detected in the resonant current detector unit is input into the inversion input. The comparators 32 and 34 configure a resonant current threshold value detector circuit that detects a timing immediately before the polarity of the resonant current ICr, represented by the detection voltage VIS, is inverted. The output of the comparator 32 is connected to one terminal of the switch SW3 of the second selector 38, while the output of the comparator 34 is connected to one terminal of the switch SW4 of the second selector 38. The control input of the switch SW3 of the second selector 38 is connected to the other terminal of the switch SW1 of the first selector 36, while the control input of the switch SW4 of the second selector 38 is connected to the other terminal of the switch SW2 of the first selector 36. The other terminals of the switches SW3 and SW4 of the second selector 38 are connected to the protection circuit 42.

The protection circuit 42 also receives alarm signals from an unshown overcurrent detector circuit, overvoltage detector circuit, low-voltage protection circuit, and the like, included in the resonant switching power supply device, and the output of the protection circuit 42 is connected to a deactivated control input terminal of the oscillator 18.

A feedback value fed back from the output voltage monitor circuit 10 is input into the feedback circuit 16, and the feedback circuit 16 outputs a control signal in accordance with the output voltage to the oscillator 18. That is, when a feedback value commensurate with the output voltage having increased is input, the feedback circuit 16 outputs a control signal that causes the control frequency to rise to the oscillator 18. Conversely, when a feedback value commensurate with the output voltage having decreased is input, the feedback circuit 16 outputs a control signal that causes the control frequency to fall to the oscillator 18.

The oscillator 18 generates the control frequency of a signal that turns the two switches Q1 and Q2 on and off alternately, with the control frequency being finely adjusted based on the control signal provided by the feedback circuit 16. Also, the oscillator 18 can stop an oscillation operation in accordance with a signal provided by the protection circuit 42.

The dead time generator circuits 20 and 22 are for setting an off-state period of a predetermined length in order to prevent a short current circuit from flowing through the switches Q1 and Q2 due to a delay in switching time, or the like, when the two switches Q1 and Q2 are turned on and off alternately.

The low side driver 24 and high side driver 26 receive signals whose time axes have been shaped by the dead time generator circuits 20 and 22, and drive the switches Q1 and Q2 to be turned on and off alternately at the control frequency generated by the oscillator 18.

Each of the comparators 28 and 30 compares the VNP detection voltage detected by the second winding P2 with a reference voltage in the vicinity of zero volts, thus detecting the timing of a polarity inversion at which the voltage VNP of the first winding P1 of the transformer T becomes zero. As the phase of the voltage VNP is further advanced than that of the detection voltage VIS detected by the resonant current detector unit, the resonant current becoming zero is detected in advance.

The comparators 32 and 34 compare the detection voltage VIS detected by the resonant current detector unit with the second threshold value Vth2 and first threshold value Vth1 respectively, thus detecting a timing immediately before a polarity inversion of the resonant current by the detection voltage VIS exceeding the second threshold value Vth2 and first threshold value Vth1 in the direction of polarity inversion. Whether the timing of the resonant current polarity inversion is abnormal or not is determined based on the results of the detections by the comparators 28 and 30, and whether the determination result is to be sent to the protection circuit 42 or not is controlled via the first selector 36 and second selector 38.

The first selector 36 is operated by the phase determination circuit 40. That is, the phase determination circuit 40 receives the oscillation output of the oscillator 18 and the outputs of the comparators 28 and 30 and, with a timing at which the on and off-states of the switches Q1 and Q2 are switched as a trigger, confirms the phase of the voltage VNP at the time of the trigger. Because of this, when the switches Q1 and Q2 are switched, it is possible to determine whether the voltage VNP being observed will increase or decrease next, and in accordance with this, the phase determination circuit 40 switches the first selector 36 so as to validate the output of the positive side comparator 28 or negative side comparator 30.

Next, referring to FIG. 3, a description will be given of an operation of the resonant switching power supply device with the heretofore described configuration. FIG. 3 shows, from the top, the drain-to-source voltage of the switch Q1, the on-state signal of the switch Q1, the resonant current ICr, the detection voltage VIS corresponding to the resonant current, the voltage of the second winding P2 corresponding to the voltage VNP of the first winding P1, and the drain current of the switch Q1. Voltage and current waveforms relating to an operation of the switch Q1 are shown in FIG. 3, and as the case of the switch Q2 is also the same, only an operation relating to the switch Q1 is shown.

Firstly, a description will be given of an unshown normal operation. On the switch Q1 being turned on, the resonant current detection voltage VIS is inverted once from positive to negative, and in the event that the on-state period of the switch Q1 continues, the detection voltage VIS presently starts to increase again. Then, when the operating condition is normal, the switch Q1 is turned off before the detection voltage VIS becomes positive again.

Meanwhile, in the event that the on-state period of the switch Q1 becomes excessive due to an overload condition, or the like, the resonant current detection voltage VIS, after being inverted from positive to negative, attempts to become positive again, as shown in FIG. 3. Because of this, the negative second threshold value Vth2 is provided, and when the resonant current detection voltage VIS exceeds a current value corresponding to the second threshold value Vth2, the switch Q1 is turned off. However, when carrying out a comparison with the second threshold value Vth2 from the start of the on-state of the switch Q1, the detection voltage VIS immediately after the switch Q1 is turned on is of a positive value, because of which an unintended switching off occurs immediately after the switch Q1 is turned on. Because of this, the voltage of the second winding P2 corresponding to the voltage VNP of the first winding P1 of the transformer T, whose phase is further advanced than that of the resonant current, is monitored, and the second threshold value Vth2 is masked until the voltage of the second winding P2 is inverted.

That is, the comparator 28 of the polarity detector circuit monitors the voltage VNP of the first winding P1 by monitoring the voltage of the second winding P2 of the transformer T, and the switch SW1 of the first selector 36 is open (cut off) until the output of the comparator 28 is inverted. As a result of this, the switch SW3 of the second selector 38 is open, because of which the comparison by the comparator 32 of the detection voltage VIS and second threshold value Vth2 is invalidated. Because of this, for example, the detection voltage VIS exceeds the second threshold value Vth2 immediately after the switch Q1 is turned on, but this is not communicated to the protection circuit 42 because the comparator 28 of the polarity detector circuit is masking the result of the comparison by the comparator 32.

On the voltage of the second winding P2 being inverted, and the switch SW3 of the second selector 38 being closed (having continuity), the second threshold value Vth2 is validated, and when the comparator 32 detects that the detection voltage VIS has exceeded the second threshold value Vth2, the switch Q1 is turned off. That is, in the event that the on-state period of the switch Q1 becomes excessive due to an overload condition, or the like, it is detected in advance from the detection of the inversion of the voltage of the second winding P2 that the resonant current, inverted from positive to negative after the turning on of the switch Q1, will be inverted to positive again, and the resonant current is prevented from being inverted to positive again. Because of this, as it is possible to reliably turn off the switch Q1 in response to the inversion of the resonant current in the on-state period of the switch Q1, the occurrence of a diode recovery current and large di/dt is eliminated, and it is thus possible to increase reliability.

In the same way, in a condition in which the switch Q2 is in an on-state, the detection voltage VIS changes once from negative to positive, and in the event that the off-state period of the switch Q1 continues, the detection voltage VIS presently starts to decrease again. Even in the event that the on-state period of the switch Q2 becomes excessive due to an overload condition, or the like, the switch Q2 is turned off when the detection voltage VIS falls below the positive first threshold value Vth1, because of which it is possible to prevent an inversion of the resonant current. In this case, opposite to the condition in which the switch Q1 is in an on-state, the comparator 30 invalidates the first threshold value Vth1 until the voltage of the second winding P2 of the transformer T changes to positive.

According to the above, even in the event that the resonant current is low (at or below the threshold value) immediately after the switches Q1 and Q2 are turned on or when there is a light load, it is possible to maintain an on-state at least until the voltage of the second winding P2 is inverted, and thus possible to maintain a desired on-state duration, because of which it is possible to set the first and second threshold values Vth1 and Vth2 to values not in the vicinity of zero. Because of this, as it is possible to take any value ensuring a margin with respect to the inversion of the resonant current, it does not happen that the switches Q1 and Q2 are forcibly turned off contrary to intentions.

In the first embodiment, the resonant current detector unit is configured of the auxiliary capacitor Cs and resistor Rs connected in series between the connection point of the resonant capacitor Cr and resonant inductor Lr and the negative terminal of the direct current power supply Ed, but another configuration may be adopted. For example, it is possible to adopt a configuration for the resonant current detector unit such that the auxiliary capacitor Cs is connected in parallel to the resonant capacitor Cr, and the current flowing through the auxiliary capacitor Cs is converted into voltage and extracted by a resistor with a small resistance value.

Figure 4:
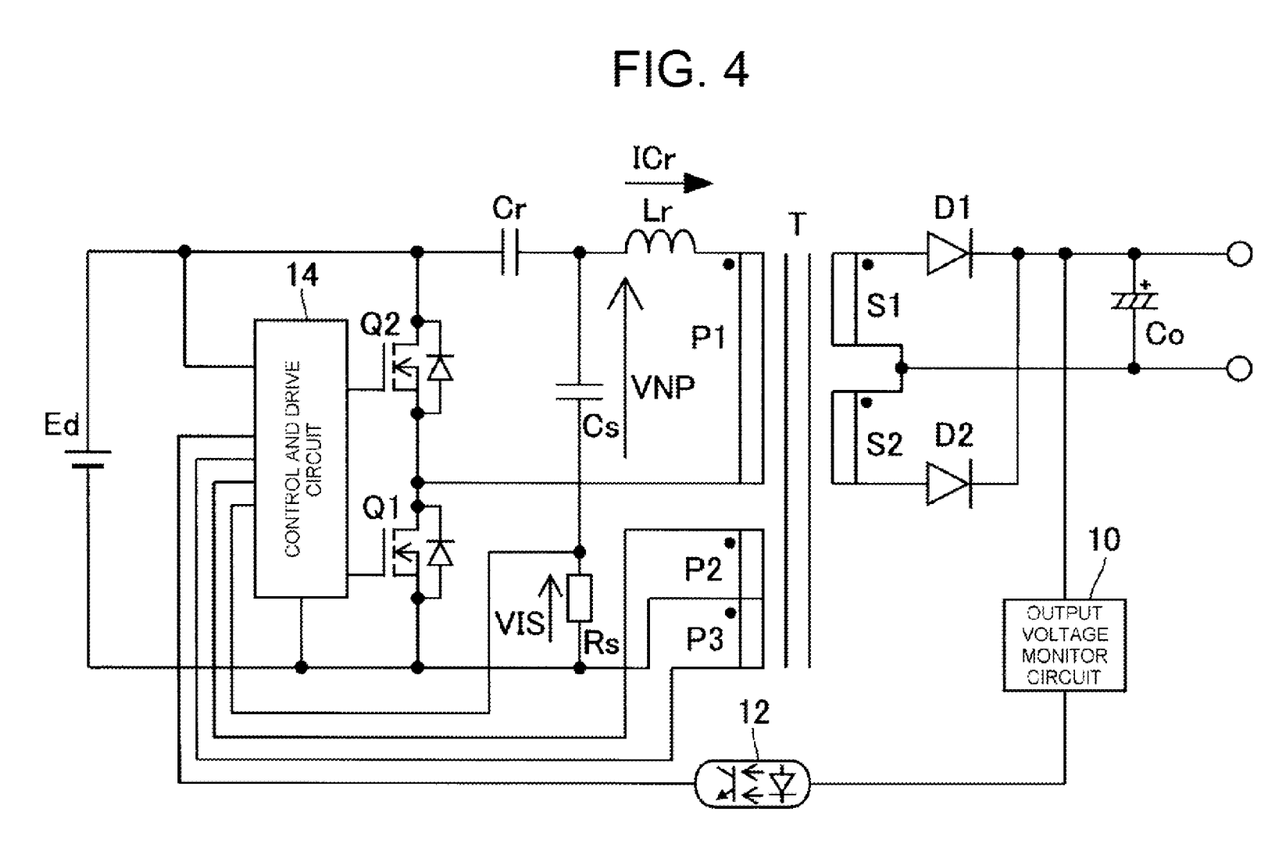
FIG. 4 is a circuit diagram showing an example of a configuration of a resonant switching power supply device according to a second embodiment.
Figure 5:
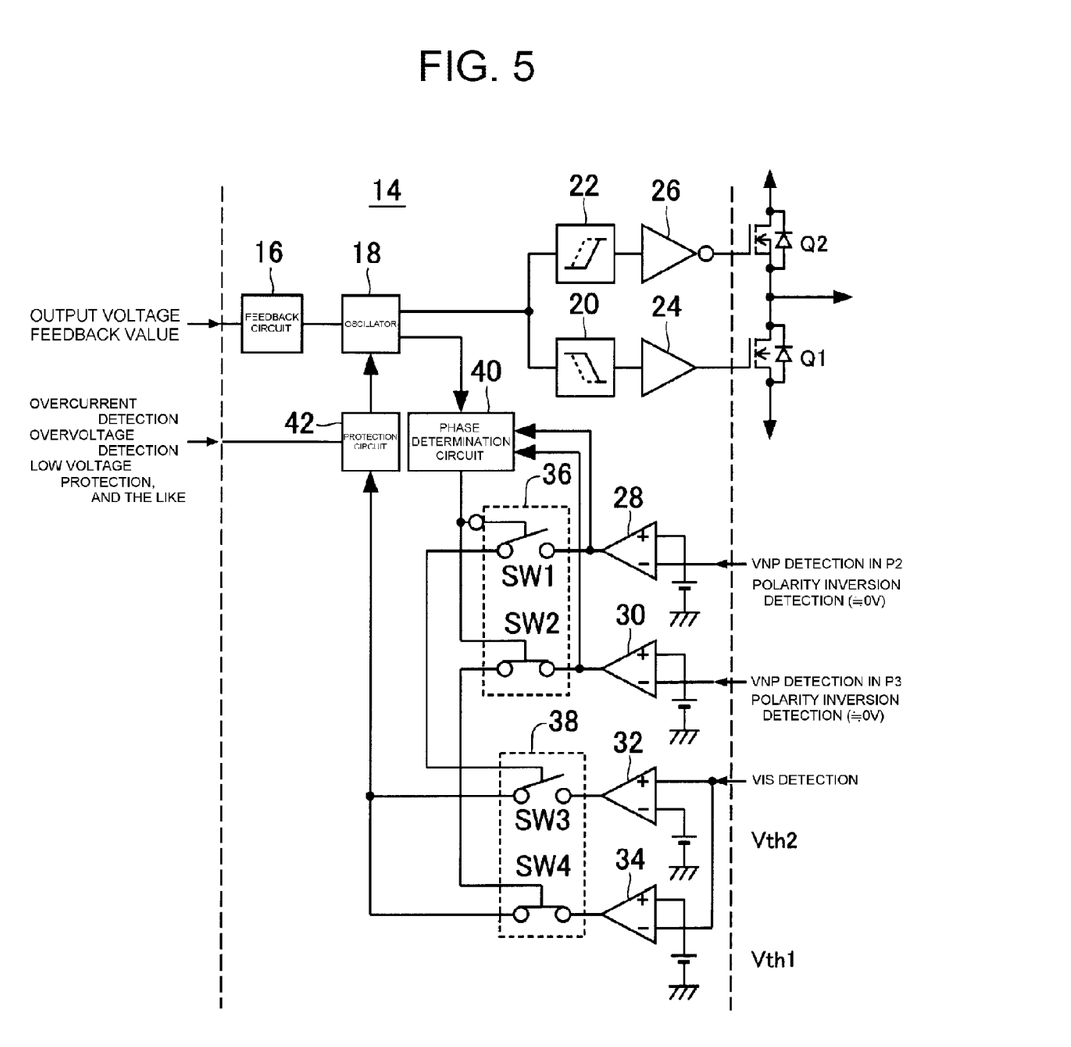
FIG. 5 is a circuit diagram showing an example of a configuration of a control and drive circuit.
Figure 6:
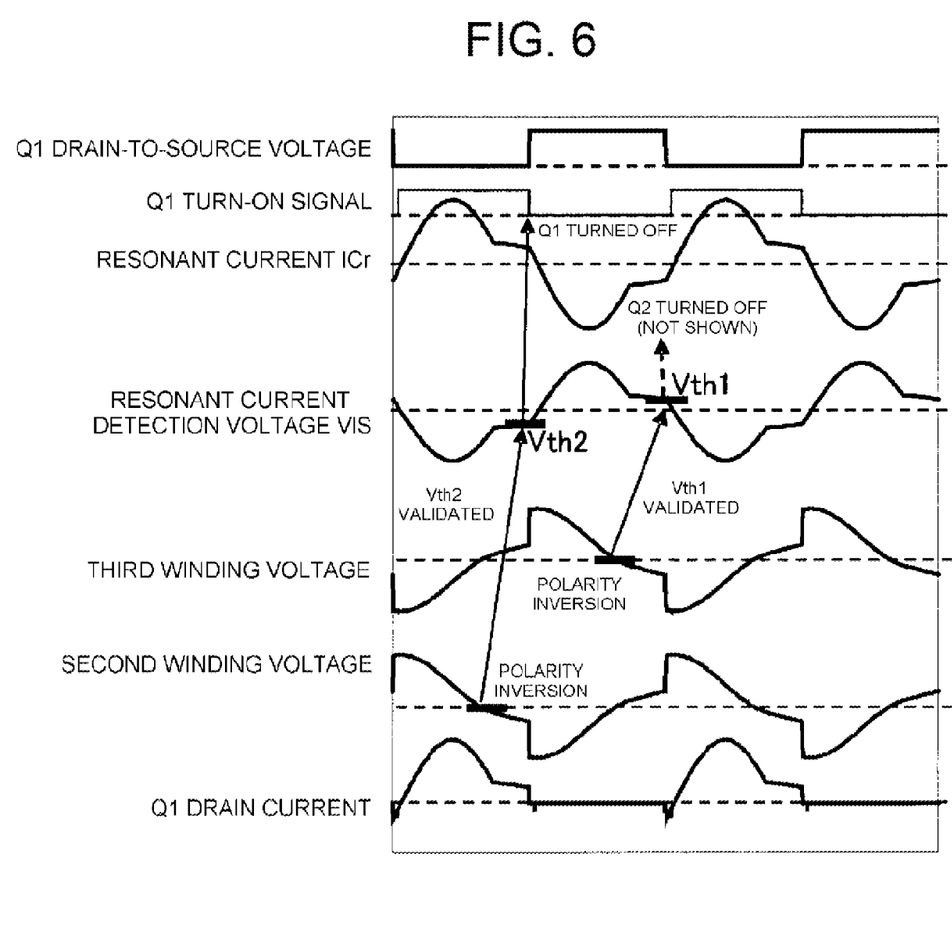
FIG. 6 is an illustration showing an operating condition of the resonant switching power supply device according to the second embodiment.

FIG. 4 is a circuit diagram showing an example of a configuration of a resonant switching power supply device according to a second embodiment, FIG. 5 is a circuit diagram showing an example of a configuration of a control and drive circuit, and FIG. 6 is an illustration showing an operating condition of the resonant switching power supply device according to the second embodiment. In FIG. 4 and FIG. 5, components the same as or equivalent to components shown in FIG. 1 and FIG. 2 are given the same reference signs, and a detailed description thereof will be omitted.

The resonant switching power supply device according to the second embodiment additionally includes a third winding P3, of a polarity differing from that of the second winding P2, on the primary side of the transformer T, as shown in FIG. 4, and the output terminal of the third winding P3 is connected to the control and drive circuit 14. Herein, the second winding P2 and third winding P3 configure a winding voltage detector unit. With regard to components other than the third winding P3, this resonant switching power supply device is the same as the resonant switching power supply device according to the first embodiment.

The control and drive circuit 14 is such that the output terminal of the second winding P2 of the transformer T is connected to the inversion input of the comparator 28, while the output terminal of the third winding P3 is connected to the inversion input of the comparator 30, as shown in FIG. 5. Because of this, as shown in FIG. 6, a voltage of a polarity the reverse of that of a voltage detected by the second winding P2 is obtained in the third winding P3, and is used exclusively for detecting the timing at which the voltage VNP becomes zero in a period for which the high side switch Q2 is in an on-state.

An operation of this resonant switching power supply device is the same as that according to the first embodiment, except that the voltage VNP input into the polarity detector circuit is obtained from the second winding P2 and third winding P3, which output detection voltages of mutually opposite polarities. That is, the comparator 28 receives a voltage corresponding to the voltage VNP from the second winding P2, and when it is detected that the polarity of the voltage has been inverted from positive to negative, the output of the comparator 32 is connected to the protection circuit 42, and the result of the comparison with the second threshold value Vth2 is validated. When it is detected by the comparator 32 that the resonant current has exceeded a current value corresponding to the second threshold value Vth2 in the on-state period of the switch Q1, the switch Q1 is turned off by the protection circuit 42. In the same way, the comparator 30 receives a voltage corresponding to the voltage VNP from the third winding P3, and when it is detected that the polarity of the voltage has been inverted from positive to negative, the output of the comparator 34 is connected to the protection circuit 42, and the result of the comparison with the first threshold value Vth1 is validated. When it is detected by the comparator 34 that the resonant current has fallen below a current value corresponding to the first threshold value Vth1 in the on-state period of the switch Q2, the switch Q2 is turned off by the protection circuit 42.

Figure 7:
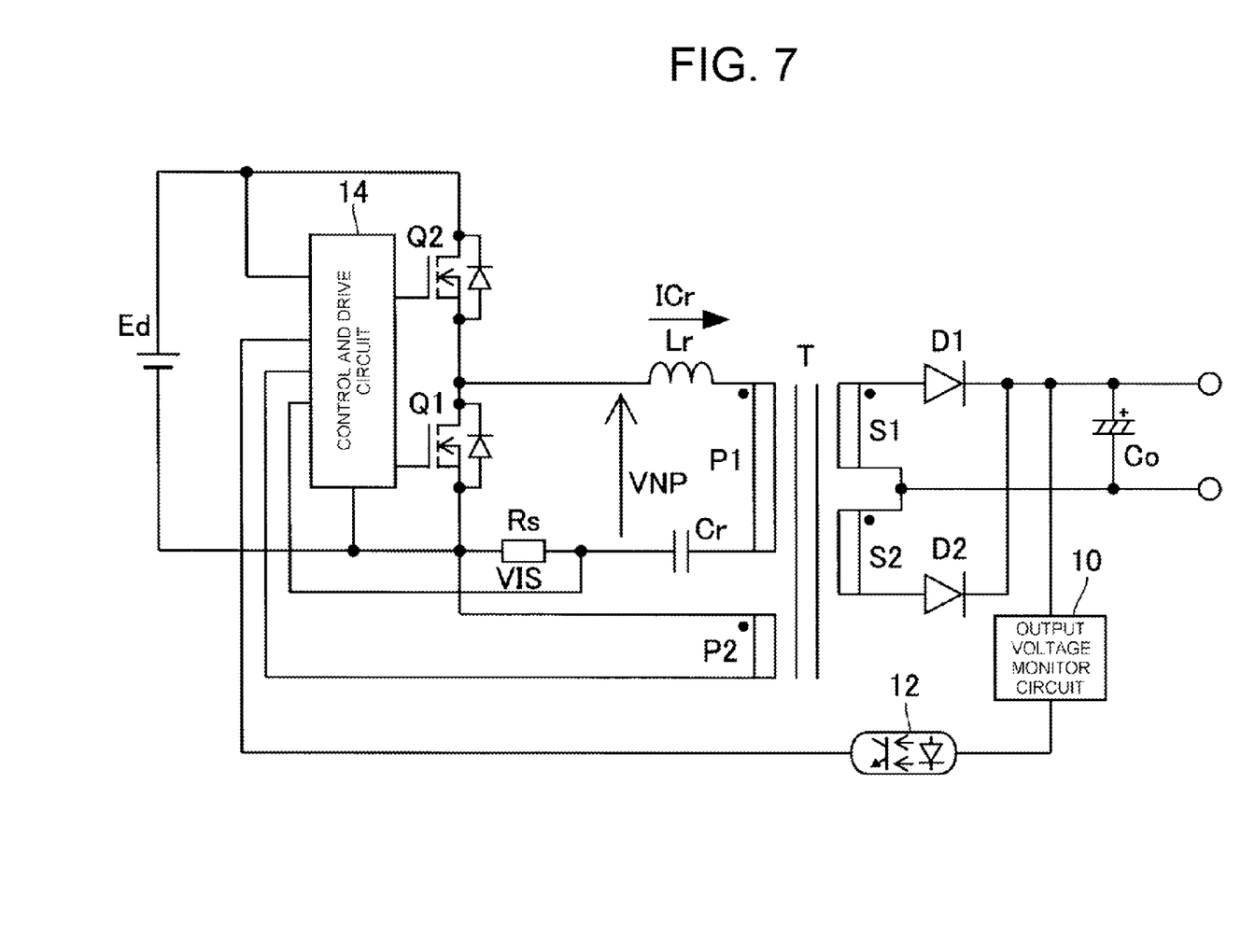
FIG. 7 is a circuit diagram showing an example of a configuration of a resonant switching power supply device according to a third embodiment.

FIG. 7 is a circuit diagram showing an example of a configuration of a resonant switching power supply device according to a third embodiment. In FIG. 7, components the same as or equivalent to components shown in FIG. 1 are given the same reference signs, and a detailed description thereof will be omitted.

The resonant switching power supply device according to the third embodiment has a configuration wherein the transformer T is connected in parallel to the low side switch Q1, as shown in FIG. 7. That is, the series circuit of the resonant inductor Lr, the first winding P1 on the primary side of the transformer T, and the resonant capacitor Cr configuring the resonant circuit is connected to both ends of the low side switch Q1. The resistor Rs that detects the resonant current ICr is inserted into the series circuit, configuring a resonant current detector unit. A connection point of the resistor Rs and resonant capacitor Cr is connected to the control and drive circuit 14, and the detection voltage VIS from the resistor Rs is supplied to the resonant current detector circuit of the control and drive circuit 14. Also, the resonant inductor Lr may be configured of the transformer leakage inductor. In this embodiment, the polarity of the detection voltage VIS and the polarity of the resonant current ICr are the same.

The negative side terminal of the second winding P2 on the primary side of the transformer T is connected to the control and drive circuit 14, and the second winding P2 supplies a voltage corresponding to the voltage VNP of the first winding P1 to the polarity detector circuit of the control and drive circuit 14.

The control and drive circuit 14 of this resonant switching power supply device is basically the same as that shown in FIG. 2. However, as the plus or minus (polarity) of the detection voltage VIS and the plus or minus (polarity) of the resonant current ICr are the same, the first threshold value Vth1 is a negative voltage, the second threshold value Vth2 is a positive voltage, and the connection of signals to the inversion input terminals and non-inversion input terminals of the comparators 32 and 34 is the reverse of that in FIG. 2. Because of this, an operation is also the same as that of the first embodiment. Of course, the windings detecting the voltage VNP of the first winding P1 may be the second winding P2 and third winding P3 with differing polarities, as in FIG. 4, and the control and drive circuit 14 shown in FIG. 5 may be used. In this case too, the first threshold value Vth1 is a negative voltage, the second threshold value Vth2 is a positive voltage, and the connection of signals to the inversion input terminals and non-inversion input terminals of the comparators 32 and 34 is the reverse of that in FIG. 5.

In the third embodiment, the resonant current detector unit is configured of the resistor Rs connected in series to the resonant capacitor Cr, but another configuration may be adopted. For example, it is possible to adopt a configuration for the resonant current detector unit such that the auxiliary capacitor Cs is connected in parallel to the resonant capacitor Cr, and the current flowing through the auxiliary capacitor Cs is converted into voltage and extracted by a resistor with a small resistance value.

The above description shows simply the principle of the invention. Furthermore, a large number of modifications and changes are possible for those skilled in the art and, the invention not being limited to the exact configuration and application heretofore shown and described, all corresponding modification examples and equivalents are seen as being within the range of the invention according to the attached claims and equivalents thereof.

The invention claimed is:

1. A resonant switching power supply device, comprising:
a first switch and a second switch connected in series to terminals into which a direct current voltage is input;
a series circuit of a resonant capacitor, at least one of a resonant inductor and transformer leakage inductor, and a first winding on a primary side of a transformer, connected to the first switch or the second switch;
a resonant current detector unit that detects a resonant current flowing through the series circuit;
a winding voltage detector unit that detects a winding voltage, which is a voltage across a first winding of the transformer; and
a control and drive unit that drives the first switch and second switch to be turned on and off alternately, wherein
the control and drive unit has a protection function whereby, in the event that, after detection occurs that a polarity of the winding voltage detected by the winding voltage detector unit has been inverted, either the first switch or the second switch is not in an off-state, when detection occurs that the resonant current detected by the resonant current detector unit has exceeded a threshold value with respect to another resonant current immediately before the inversion of the polarity of the winding voltage, the first switch or second switch that is not in an off-state is turned off.

2. The resonant switching power supply device according to claim 1, wherein
the resonant current detector unit is configured so that an auxiliary capacitor is connected between a connection point of the resonant capacitor and at least one of the resonant inductor and transformer leakage inductor and a negative terminal of the direct current voltage, and current flowing through the auxiliary capacitor is converted into voltage as output of the resonant current detector by a resistor.

3. The resonant switching power supply device according to claim 1, wherein
the resonant current detector unit is configured so that current flowing through the series circuit is converted into voltage as output of the resonant current detector by a resistor inserted into the series circuit.

4. The resonant switching power supply device according to claim 1, wherein
the winding voltage detector unit includes on the primary side of the transformer a second winding coupled in close proximity to the first winding.

5. The resonant switching power supply device according to claim 1, wherein
the winding voltage detector unit includes on the primary side of the transformer a second winding and a third winding of mutually reversed polarities coupled in close proximity to the first winding.

6. The resonant switching power supply device according to claim 1, wherein
the control and drive unit includes:
a polarity detector unit that detects a timing at which voltage detected by the winding voltage detector unit is inverted;
a resonant current threshold value detector circuit that, two threshold values, positive and negative, being set, detects a timing at which a threshold value, of the two threshold values, positive and negative, of a same polarity as the resonant current immediately before the polarity of the voltage detected by the winding voltage detector unit is inverted is exceeded in a direction in which the polarity of the resonant current is inverted;
a selector that, in the event that either the first switch or the second switch is not in an off-state when an inversion of polarity is detected by the polarity detector circuit, validates a detection output of the resonant current threshold value detector circuit; and
a protection circuit that turns off the first switch or the second switch that is not in an off-state in accordance with the detection output of the resonant current threshold value detector circuit.

7. An apparatus, comprising:
a control device configured to output control signals to a first switch and a second switch of a power supply device including a transformer; and
a voltage polarity change detection device configured to detect a change in polarity of a voltage of the transformer, and output a corresponding detection signal to the control device;
wherein the voltage polarity change detection device is configured to detect the change in polarity of the voltage of the transformer in advance of a change in polarity of a resonance voltage corresponding to the voltage of the transformer.

8. The apparatus of claim 7, wherein the voltage of the transformer corresponds to a first winding of the transformer, and the voltage polarity change detection device includes a second winding of the transformer.

9. The apparatus of claim 8, wherein the control device includes a first comparator device configured to detect an inversion in a polarity of a voltage of the first winding and output an inversion detection signal in response.

10. The apparatus of claim 9, wherein the control device further includes a second comparator device configured to compare the resonance voltage to a threshold voltage and output a comparison signal.

11. The apparatus of claim 10, wherein the control device is configured to cause the comparison signal output by the second comparator device to be sampled in response to the inversion detection signal output by the first comparator device, and turn off the first switch or the second switch based on a value of the comparison signal.

* * * * *